United States Patent
Jamadagni et al.

(10) Patent No.: US 10,045,283 B2
(45) Date of Patent: Aug. 7, 2018

(54) METHOD AND SYSTEM OF PROVIDING SMALL CELL INFORMATION TO USER EQUIPMENTS IN A HETEROGENEOUS NETWORK ENVIRONMENT

(75) Inventors: Satish Nanjunda Swamy Jamadagni, Bangalore (IN); Rajavelsamy Rajadurai, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 358 days.

(21) Appl. No.: 14/001,412

(22) PCT Filed: Feb. 27, 2012

(86) PCT No.: PCT/KR2012/001455
§ 371 (c)(1),
(2), (4) Date: Aug. 23, 2013

(87) PCT Pub. No.: WO2012/115489
PCT Pub. Date: Aug. 30, 2012

(65) Prior Publication Data
US 2013/0331100 A1    Dec. 12, 2013

(30) Foreign Application Priority Data
Feb. 25, 2011   (IN) .............................. 566/CHE/2011

(51) Int. Cl.
*H04W 48/16* (2009.01)
*H04W 16/32* (2009.01)
*H04W 64/00* (2009.01)

(52) U.S. Cl.
CPC ............ *H04W 48/16* (2013.01); *H04W 16/32* (2013.01); *H04W 64/00* (2013.01)

(58) Field of Classification Search
CPC ...... H04W 48/16; H04W 16/32; H04W 64/00
USPC ........................................................ 455/434
See application file for complete search history.

(56) References Cited

U.S. PATENT DOCUMENTS

| | | | |
|---|---|---|---|
| 2003/0118015 A1* | 6/2003 | Gunnarsson | H04W 48/16 370/389 |
| 2004/0106379 A1 | 6/2004 | Zen et al. | |
| 2007/0167174 A1* | 7/2007 | Halcrow | H04W 48/16 455/456.2 |
| 2009/0191892 A1* | 7/2009 | Kelley | H04W 48/20 455/456.1 |
| 2010/0003980 A1 | 1/2010 | Rune et al. | |
| 2010/0183134 A1 | 7/2010 | Vendrow et al. | |

(Continued)

*Primary Examiner* — Erica Navar
(74) *Attorney, Agent, or Firm* — Jefferson IP Law, LLP

(57) ABSTRACT

A method and a system for providing small cell information to a user equipment in a heterogeneous network environment are provided. A user equipment sends a request to a network entity for providing availability of one or more small cells in its proximity. The network entity obtains location information associated with the user equipment and retrieves a small cell map displaying the one or more small cells from a map database. Then, the network entity determines whether the one or more small cells are in the proximity of the user equipment using the small cell map. Accordingly, the network entity provides a notification indicating availability of the one or more small cells to the user equipment. Moreover, the user equipment initiates a scan for the one or more small cells based on the received notification.

15 Claims, 6 Drawing Sheets

(56) References Cited

U.S. PATENT DOCUMENTS

2010/0240397 A1 9/2010 Buchmayer et al.
2011/0016006 A1 1/2011 Opdycke

* cited by examiner

METHOD AND SYSTEM OF PROVIDING SMALL CELL INFORMATION TO USER EQUIPMENTS IN A HETEROGENEOUS NETWORK ENVIRONMENT

CROSS-REFERENCE TO RELATED APPLICATION(S)

This application is a National Stage application under 35 U.S.C. § 371 of an International application filed on Feb. 27, 2012 and assigned application PCT/KR2012/001455, and claims the benefit under 35 U.S.C. § 365(b) of an Indian patent application filed on Feb. 25, 2011 in the Indian Intellectual Property Office and assigned Serial No. 566/CHE/2011, the entire disclosure of each of which is hereby incorporated by reference.

TECHNICAL FIELD

The present disclosure relates to the field of wireless communication system. More particularly, the present disclosure relates to a method and system for providing small cell information to user equipment in a heterogeneous network environment.

BACKGROUND

Today, user equipment that combines mobile computing functionality with mobile phone functionality such as smart phones, Personal Digital Assistants (PDA) and the like, are becoming increasingly popular. These devices are usually equipped with multiple wireless network interfaces including a cellular network interface (provided by a cellular radio on a device) and a Wi-Fi interface provided by a Wi-Fi radio on the device.

Typically, the user equipment accesses a macro cell, a pico cell, or a femto cell using the cellular network interface while the user equipment accesses Wi-Fi access point using the Wi-Fi interface. In wireless network standards, pico cells, femto cells, and Wi-Fi access points are commonly termed as small cells. The small cells are generally deployed to improve indoor coverage and cell-edge user performance and boost spectral efficiency per area unit via spatial reuse. The small cells either operator deployed or user deployed and may coexist in same geographical area, potentially sharing the same spectrum or a different spectrum.

For accessing the small cells, typically, the user equipment continuously scans for one or more small cells when in idle state. This may lead to significant amount of wastage of battery power as most of the times the user equipment may perform continuous passive scans for detecting small cells even when there are no small cells in vicinity of the user equipment. Continuous passive scan for small cells reduces battery life of the user equipment by almost half between consecutive charges.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide to a method and system for providing small cell information to user equipment in a heterogeneous network environment.

In accordance with an aspect of the present disclosure, a method is provided. The method includes obtaining location information associated with a user equipment, determining whether one or more small cells are in proximity of the user equipment based on a small cell map, and when one or more small cells are in the proximity of the user equipment, providing a notification indicating availability of the one or more small cells in the proximity of the user equipment so that the user equipment initiates scanning of the one or more small cells based on the notification.

In accordance with another aspect of the present disclosure, an apparatus is provided. The apparatus includes a processor, and a memory coupled to the processor, wherein the memory includes a small cell management module configured to obtain location information associated with a user equipment, determine whether one or more small cells are in proximity of the user equipment based on a small cell map, and when one or more small cells are in the proximity of the user equipment, provide a notification indicating availability of the one or more small cells in the proximity of the user equipment so that the user equipment initiates scanning of the one or more small cells based on the notification.

In accordance with another aspect of the present disclosure, a method is provided. The method includes sending a request to a core network entity for providing availability of one or more small cells in proximity of a user equipment, receiving a notification indicating availability of the one or more small cells in the proximity of the user equipment from the core network entity, and initiating a scan for the one or more small cells based on the received notification.

In accordance with another aspect of the present disclosure, an apparatus is provided. The apparatus includes a processor, and a memory coupled to the processor, wherein the memory includes a small cell scan module configured to send a request to a core network entity for availability of one or more small cells in proximity of the user equipment, receive a notification indicating availability of the one or more small cells in the proximity of the user equipment from the core network entity, and initiate a scan for the one or more small cells based on the received notification.

In accordance with another aspect of the present disclosure, a system is provided. The system includes at least one user equipment, a network entity, and a memory configured to store a map database, wherein the at least one user equipment is configured to send a request to the network entity for availability of one or more small cells in proximity of the at least one user equipment, wherein the network entity is configured to obtain location information associated with the at least one user equipment, to retrieve a small cell map displaying the one or more small cells from the map database, and wherein the network entity is configured for determining whether the one or more small cells are in the proximity of the at least one user equipment based on the small cell map, to provide a notification indicating availability of the one or more small cells in the proximity of the at least one user equipment based on the determination, and wherein the at least one user equipment is further configured to initiate a scan for the one or more small cells based on the received notification.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms 'proximity', 'geographic proximity' and 'vicinity' are interchangeably used throughout the document.

Figure 1:
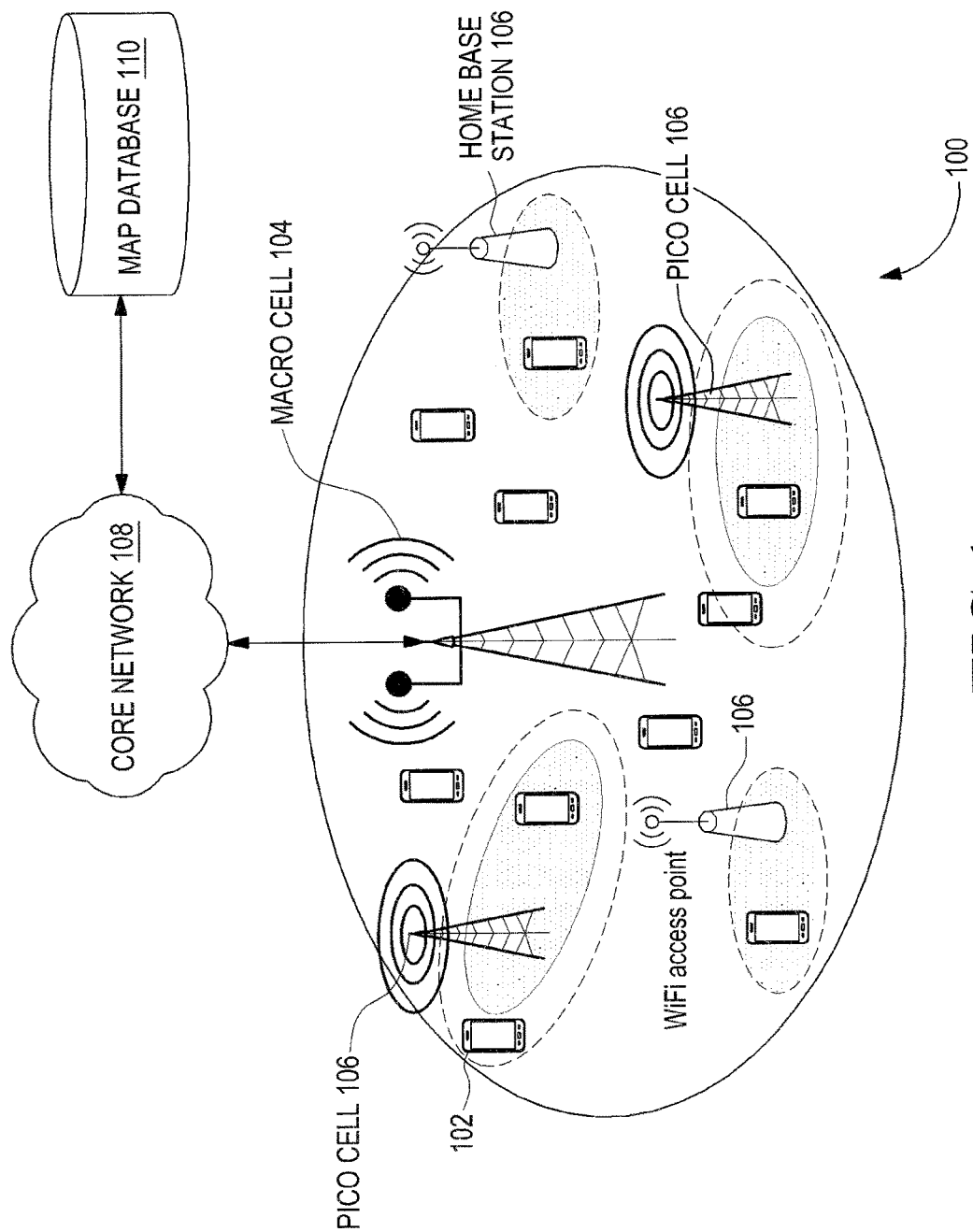
FIG. 1 is a schematic diagram illustrating a heterogeneous network environment including a core network for providing location based small cell information to user equipment via macro cells according to an embodiment of the present disclosure.

FIG. 1 is a schematic diagram illustrating a heterogeneous network environment including a core network for providing location based small cell information to user equipment via macro cells according to an embodiment of the present disclosure.

Referring to FIG. 1, the heterogeneous network environment 100 includes user equipment 102, a macro cell 104, small cells 106, a core network 108, and a map database 110.

The user equipment 102 may include devices that combine mobile computing functionality with mobile phone functionality, such as smart phones, Personal Digital Assistants (PDAs), and the like. The user equipment 102 is in a coverage area of the macro cell and is connected to the core network 108 via the macro cell 104. The user equipment 102 may be mobile or static within the coverage of the macro cell 108. The small cells 106 include pico cells, femto cells, and Wi-Fi access points located within the coverage area of the macro cell 108. The small cells 106 are deployed by an operator or a user to improve indoor coverage and cell-edge user performance, and to boost spectral efficiency per area unit via spatial reuse. The small cells 106 are scattered within the coverage area of the macro cell 104 so that load on the macro cell 104 can be mitigated.

If any of the user equipment 102 wishes to access one or more small cells 106 located within the network coverage area of the macro cell 108, the user equipment 102 sends a request message to the core network 108 requesting notification of small cells 106 available in the vicinity of the user equipment 102. The request message may include a type of interested small cells 106, a location of the user equipment 102, and the like. Based on the request and the location of the user equipment 102, the core network 108 determines whether any small cells are present in geographic proximity to the user equipment 102. In one embodiment of the present disclosure, the core network 108 fetches a small cell map from the map database 110 and compares the location of the user equipment 102 with location of the small cells 106 in the small cell map.

If any small cells 106 are detected, the core network 108 notifies the user equipment 102 of the availability of the small cells 106 in proximity to the user equipment 102. Accordingly, the user equipment 102 initiates a scan for small cells 106 indicated in the notification for accessing one or more small cells 106 in proximity to the user equipment 102. This saves a significant amount of battery power required by the user equipment 102 for performing continuous passive scan of small cells 106. The interaction between the user equipment 102 and the core network 108 is described below with respect to FIG. 2.

Figure 2:
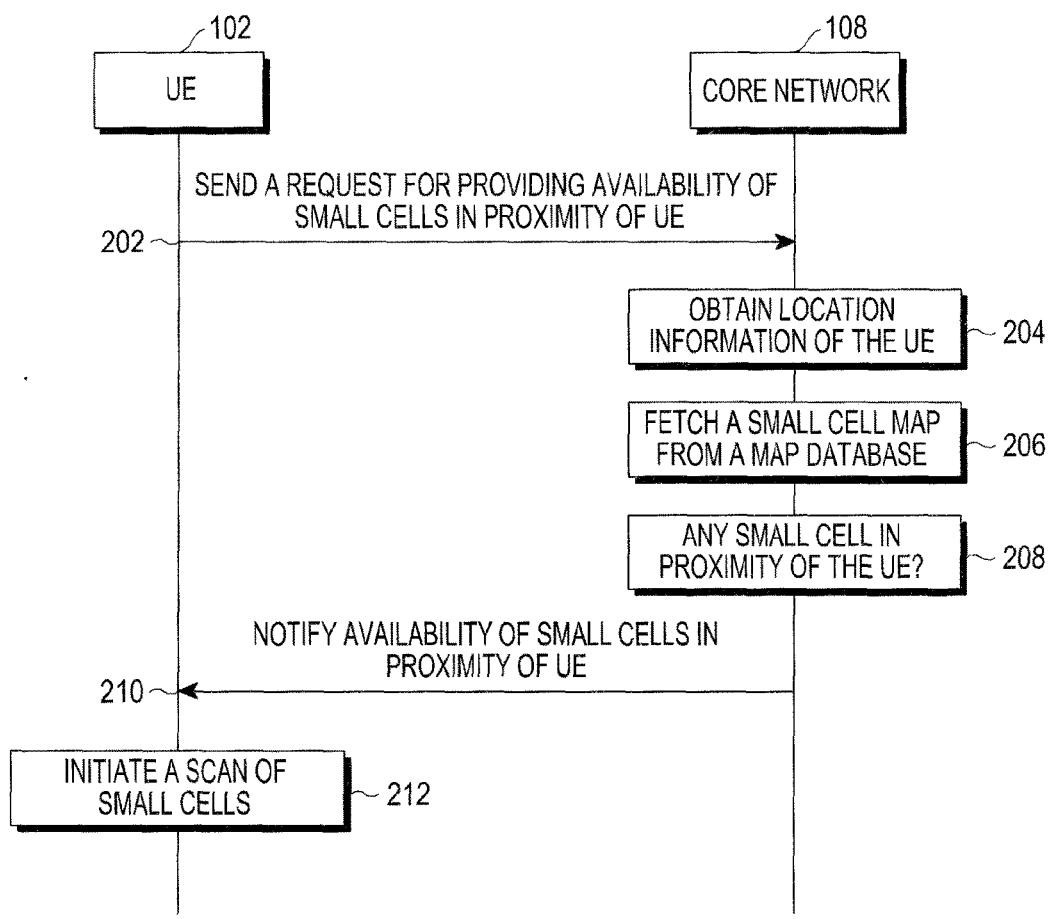
FIG. 2 is a flow diagram illustrating a method of notifying availability of small cell(s) in proximity to user equipment according to an embodiment of the present disclosure.

FIG. 2 is a flow diagram illustrating a method of notifying availability of small cell(s) in proximity to the user equipment, according to an embodiment of the present disclosure.

At operation 202, the user equipment 102 sends a request for providing availability of small cells in geographical proximity of the user equipment 102 to the core network 108 via the macro cell 104. In various embodiments, the user equipment 102 may include geographical coordinates, a type of small cells 106 of interest, and capabilities of the user equipment 102 to access different types of small cells 106 in the request. For example, if the user equipment is a Wi-Fi enabled device, the request may indicate type of small cells as Wi-Fi access point, and capabilities as Wi-Fi enabled. Alternatively, the user equipment 102 may communicate capabilities of the user equipment 102 with the core network 108 through a capability exchange procedure.

At operation 204, the core network 108 obtains location information indicative of current location of the user equipment 102. In one embodiment of the present disclosure, the core network tracks a location of the user equipment 102 in real time based on a tracking area identifier, evolved Node B (eNB) identifier or a cell identifier. In another embodiment of the present disclosure, the core network 108 obtains a current location of the user equipment 102 from the user equipment 102. In another embodiment of the present disclosure, the core network 108 uses geographical coordinates indicated in the received request as current location of the user equipment 102. In another embodiment of the present disclosure, the core network 108 may request a serving mobile location center or any location server to provide current location information of the user equipment 102.

At operation 206, the core network 108 fetches a small cell map from a map database. At operation 208, the core network 108 determines whether any small cells are available in proximity of the user equipment 102. The core network 108 may consider granularity of small cells 106 located around the user equipment 102 as sector level granularity, cell level granularity, tracking area granularity, location area granularity, or routing area granularity. For example, the core network 108 knows cell level granularity of UE's location when the user equipment is in connected mode. However, when the user equipment 102 is in idle mode, the granularity of the location is a tracking area granularity or a location area granularity.

At operation 210, the core network 108 notifies the user equipment 102 of the availability of small cell(s) around the current location of the user equipment 102. In one embodiment of the present disclosure, the core network 108 transmits the small cell map overlapped with cell identifier information, a type of small cells 106 located around the user equipment 102, and cell access parameters associated with the small cells 106 to the user equipment 102. In another embodiment of the present disclosure, the core network 108 transmits the geographic co-ordinates map, a type of small cells 106 located around the user equipment 102, and the cell access parameters associated with the small cells 106 to the user equipment 102. Maps (i.e., small cell maps overlapped with cell identified information or geographical coordinate maps) may have different size granularities for a known granularity of UE's location. Given the location granularity knowledge about the user equipment 102, the core network 108 can provide the user equipment 102 with small cell maps overlapped with cell identifier information or geographic coordinate maps to the known granularity. In another embodiment of the present disclosure, the core network 108 transmits small cell information associated with small cells 106 surrounding the user equipment 102.

In an implementation, the core network 108 provides the small cell maps overlapped with cell identifier information, the geographic coordinate maps, or the small cell information to the user equipment 102 in a non-access stratum message. In various embodiments, the core network 108 provides the small cell maps overlapped with cell identifier information, the geographic coordinate maps, or the small cell information to the user equipment 102 in a new non-access stratum message or in an existing non-access stratum message such as a Tracking Area Update (TAU) response. For example, the user equipment 102 may send a TAU request to the core network 108 for notifying availability of one or more small cells 106 in its geographic proximity. The core network 108 sends a TAU response including the small cell maps overlapped with cell identifier information, the geographic coordinate maps, or the small cell information to the user equipment 102. The TAU request-response procedure is followed when the user equipment 102 is in idle mode (i.e., not involved in data communication with the core network 108).

In another implementation, the core network 108 provides the small cell maps overlapped with cell identifier information, the geographic coordinate maps, or the small cell information to the user equipment 102 in a Layer 2 or Layer 3 messages such as Radio Resource Connection (RRC) message, a RRC connection reconfiguration message, and a proximity indication configuration message.

In another implementation, the core network 108 broadcasts the small cell maps overlapped with cell identifier information, the geographic coordinate maps, or the small cell information to the user equipment 102 in a system information message. In another implementation, the core network 108 broadcasts the small cell maps overlapped with cell identifier information, the geographic coordinate maps, or the small cell information to the user equipment 102 in a Multi-media Broadcast Multicast System (MBMS) channel such as an MBMS control channel or an MBMS traffic channel.

In another implementation, the user equipment 102 obtains the small cell maps overlapped with cell identifier information, the geographic coordinate maps, or the small cell information from the core network 108 when the core network 108 configures the user equipment 102 for measurements or Minimization Drive Test (MDT) logs. In another implementation, the core network 108 may transmit a push notification indicating availability of the one or more small cells 106 in the geographical proximity, where the push notification may include the small cell maps overlapped with cell identifier information, the geographic coordinate maps, or the small cell information to the user equipment 102.

At operation 212, the user equipment 102 may initiate a complete or selective scan for small cells 106 indicated via the notification by the core network 108. This helps the user equipment 102 to conserve battery power, as a scan for small cells 106 is initiated upon receiving a notification indicating availability of small cells 106 in the geographic proximity of the user equipment 102. In this manner, scan for the small cell(s) is localized in the heterogeneous network environment 100.

If, at operation 208, it is determined that no small cells 106 are available in proximity to the user equipment 102, then the core network 108 sends a notification indicating that small cells 106 are unavailable in the proximity of the user equipment 102 in a broadcast message or a dedicated control channel message. Accordingly, the user equipment 102 determines whether there is any scan ongoing for detecting small cells 106 and terminates the ongoing scan for small cells 106.

Figure 3:
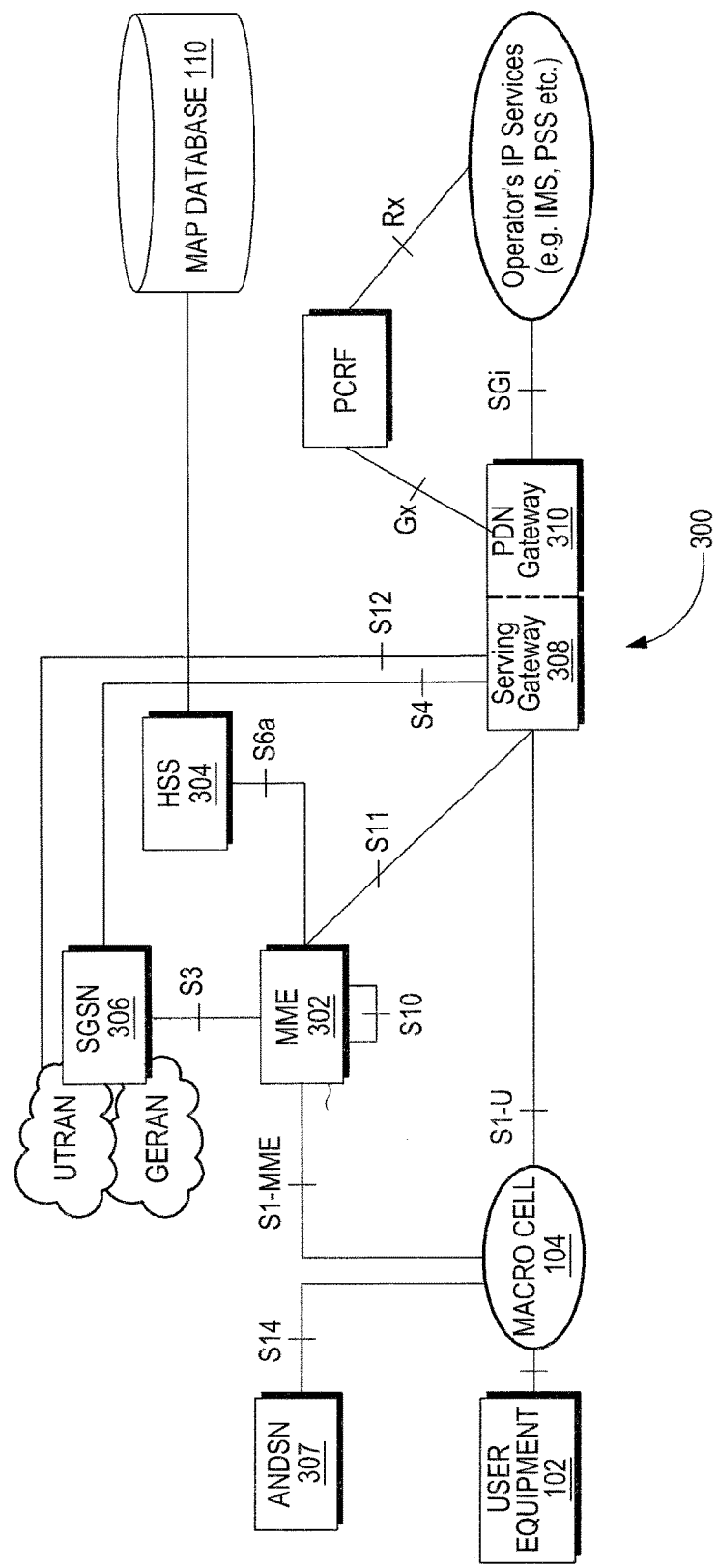
FIG. 3 is a schematic diagram illustrating a Long Term Evolution (LTE) system for providing location based small cell information to user equipment according to an embodiment of the present disclosure.

FIG. 3 is a schematic diagram illustrating a Long Term Evolution (LTE) system for providing location based small cell information to user equipment according to an embodiment of the present disclosure.

Referring to FIG. 3, an LTE core network 300 includes various core network entities involved in notifying availability of small cells 106 in geographic proximity to the user equipment 102. The LTE core network 300 is an embodiment of the core network 108 of FIG. 1. The core network entities include a Mobility Management Entity (MME) 302, a Home Subscriber Server (HSS) 304, a Serving GPRS Support Node (SGSN) 306, an Access Network Discovery and Selection Function (ANDSF) 307, a serving gateway 308, and a Public Data Network (PDN) gateway 310. The user equipment 102 is connected to the MME 302 via the macro cell 104 and the HSS 304 is connected to the map database 110. The interaction between various core network entities such as the MME 302 and the HSS 304 is described below with respect to FIG. 4. Other network entities such as the SGSN 306, the ANDSN 307, the serving gateway 308, and the PDN gateway 310 are well known and hence explanation is thereof omitted.

Figure 4:
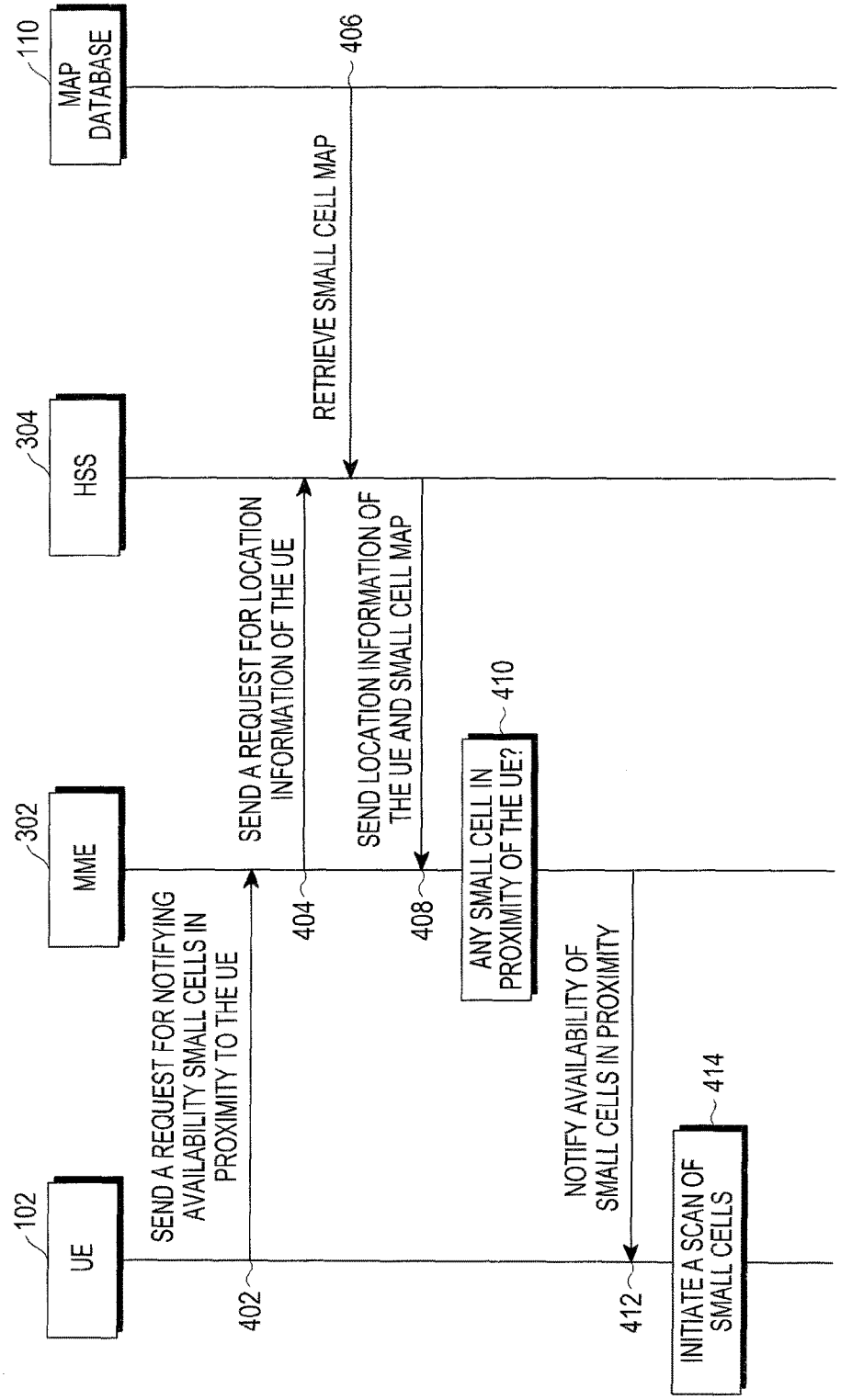
FIG. 4 is a flow diagram illustrating an interaction between network entities of an LTE system for providing location based small cell information to user equipment according to an embodiment of the present disclosure.

FIG. 4 is a flow diagram illustrating an interaction between network entities of an LTE system for providing location based small cell information to user equipment according to an embodiment of the present disclosure.

Referring to FIG. 4, at operation 402, the user equipment 102 sends a request to the MME 302 for availability of small cell(s) 106 in geographic proximity to the user equipment 102. The request may include geographical coordinates, type of small cells 106 of interest and capabilities of the user equipment 102 to access different types of small cells 106. If the request does not include the capabilities of the user equipment 102, then the MME 302 may obtain the capabilities of user equipment 102 from the HSS 304 or derive the capability to support multiple radio access technologies from the International Mobile Equipment Identity (IMEI). At operation 404, the MME 302 sends a request to the HSS 304 for location information associated with the user equipment 102. At operation 406, the HSS retrieves a small cell map overlapped with cell identifier information from the map database 110.

At operation 408, the HSS 304 provides the location information associated with the user equipment 102 and the small cell map overlapped with cell identifier information to the MME 302. At operation 410, the MME 302 determines whether any small cells 106 are present in geographical proximity to the user equipment 102. If any small cells 106 are in geographical proximity to the user equipment 102, the MME 302 sends a notification message including small cell information and the small cell map overlapped with cell identifier information or geographical coordinate map to the user equipment 302, at operation 412. At operation 414, the user equipment 102 initiates a scan for small cells 106 in geographic proximity to the user equipment 102 based on the notification message.

Although in FIG. 3 the map database 110 is shown to be connected to the HSS 304, one skilled in the art can realize that the map database 110 can be connected to any other core network entity, such as the MME 302, the SGSN 306 and the like. Further, the process operations described in FIGS. 2 and 4 can be implemented in the core network entities such as the HSS 304, the SGSN 306, and the ANDSN 307 instead of the MME 302. The process operations described in FIGS. 2 and 4 can be implemented in other network systems such as GSM EDGE Radio Access Network (GERAN) and UMTS Terrestrial Radio Access Network (UTRAN).

Figure 5:
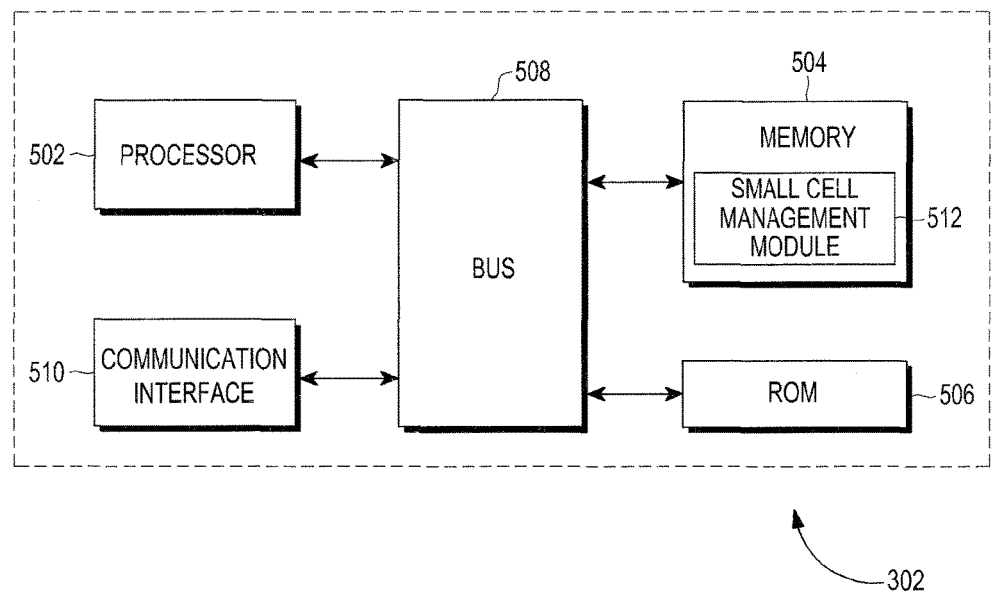
FIG. 5 illustrates a block diagram of a mobility management entity showing various components according to an embodiment of the present disclosure.

FIG. 5 illustrates a block diagram of an MME showing various components according to an embodiment of the present disclosure.

Referring to FIG. 5, the MME 302 includes a processor 502, memory 504, a Read Only Memory (ROM) 506, a bus 508, and a transceiver 510.

The processor 502, as used herein, may be any type of computational circuit, including, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 502 may also include embedded controllers, such as generic or programmable logic devices or arrays, application specific integrated circuits, single-chip computers, smart cards, and the like.

The memory 504 may be one or more of volatile memory and non-volatile memory. The memory 504 includes a small cell management module 512 for determining whether any cells are in proximity to the user equipment 102 and for providing a notification to the user equipment 102 if small cells 106 are unavailable or available in proximity to the user equipment, according to the various embodiments illustrated in FIGS. 1 to 4. A variety of non-transitory computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling memory cards, Memory Sticks™, and the like.

Various embodiments of the present disclosure may be implemented in conjunction with modules, including functions, procedures, data structures, and application programs, for performing tasks, or defining abstract data types or low-level hardware contexts. The small cell management module 512 may be stored in the form of machine-readable instructions on any of the above-mentioned storage media which is then executed by the processor 502. For example, a computer program may include machine-readable instructions capable of providing a notification to the user equipment 102 regarding unavailability/availability of the small cells 106 in the geographical proximity of the user equipment 102, according to the teachings and herein described various embodiments of the present subject matter. In one embodiment, the computer program may be included on a non-transitory storage medium and loaded from the non-transitory storage medium to a hard drive in the non-volatile memory. The components such as the ROM 506, the bus 508, and the transceiver 510 are well known to the person skilled in the art and hence the explanation is thereof omitted.

Figure 6:
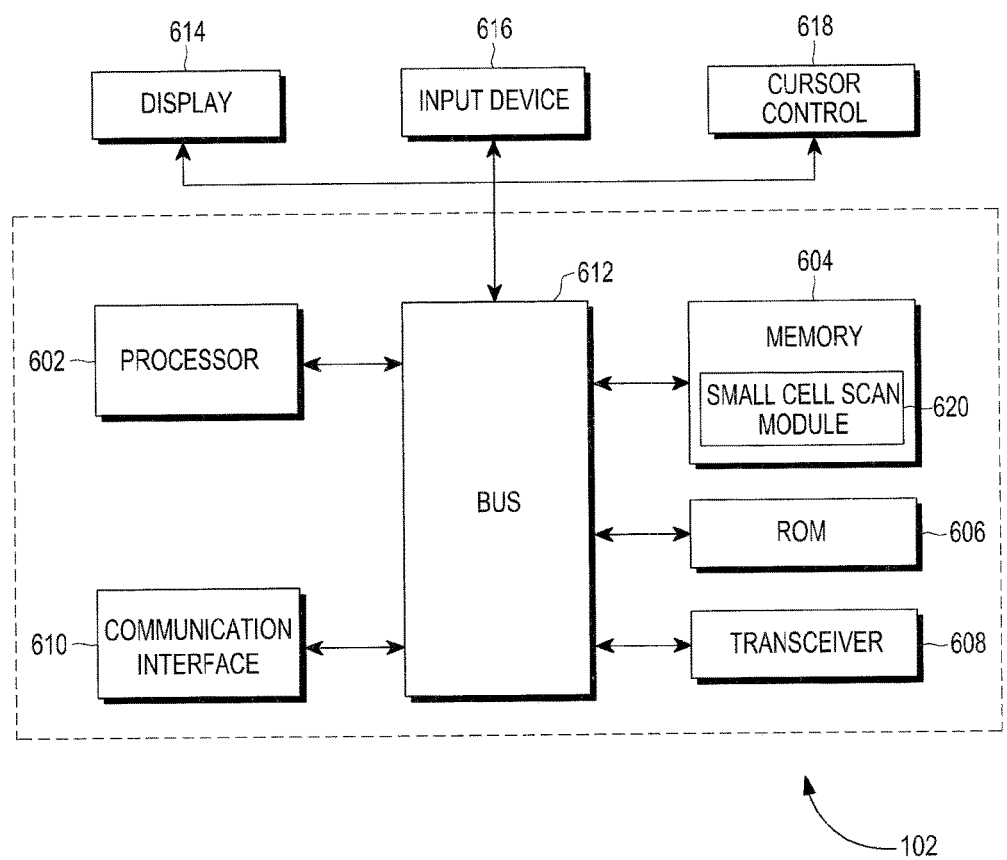
FIG. 6 is a block diagram of user equipment showing various components according to an embodiment of the present disclosure.

FIG. 6 is a block diagram of user equipment showing various components according to an embodiment of the present disclosure.

Referring to FIG. 6, the user equipment 102 includes a processor 602, memory 604, a Read Only Memory (ROM) 606, a transceiver 608, a bus 612, a communication interface 610, a display 614, an input device 616, and a cursor control 618.

The processor 602, as used herein, may be any type of computational circuit, including, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 602 may also include embedded controllers, such as generic or programmable logic devices or arrays, application specific integrated circuits, single-chip computers, smart cards, and the like.

The memory 604 and the ROM 606 may be one or more of volatile memory and non-volatile memory. The memory 604 includes a small cell scan module 620 for requesting the core network 108 to indicate availability of small cells 106 in geographical proximity and for triggering a scan for small cells 106 upon receiving indication regarding the availability of small cells 106 in the pre-defined geographic proximity, according to one or more various embodiments illustrated in FIGS. 1 to 4. A variety of non-transitory computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drives, removable media drive for handling compact disks, digital video disks, diskettes, magnetic tape cartridges, memory cards, Memory Sticks™, and the like.

Various embodiments of the present subject matter may be implemented in conjunction with modules, including functions, procedures, data structures, and application programs, for performing tasks, or defining abstract data types or low-level hardware contexts. In one embodiment, the small cell scan module 620 is stored in the form of machine-readable instructions on any of the above-mentioned non-transitory storage media and is then executed by the processor 602. For example, a computer program may include the machine-readable instructions capable of performing one or more operations for requesting the core network 108 to indicate availability of small cells 106 in geographical proximity and triggering a scan for small cells 106 upon receiving indication regarding the availability of small cells 106 in the pre-defined geographic proximity, according to the teachings and herein described various embodiments of the present subject matter. In one embodiment, the program may be included on a Compact Disk-Read Only Memory (CD-ROM) or other removable media and loaded from the CD-ROM (or other removable media) to a hard drive in the non-volatile memory.

The transceiver 608 may be capable of transmitting a request to the core network 108 to indicate availability of small cells 106 in geographical proximity and receiving an indication regarding the availability of small cells 106 in the pre-defined geographic proximity from the core network 108. The bus 612 acts as interconnect between various components of the user equipment 102. The components such as communication interfaces 610, the display 614, the input device 616, and the cursor control 618 are well known to the person skilled in the art and hence the explanation is thereof omitted.

In accordance with the various embodiments described in FIGS. 1 to 6, the core network 108 may send a push notification indicating availability of small cells 106 in the geographic proximity when the macro cell 104 wishes to handover the wireless connection with the user equipment 102 to one of the small cells 106 available in the geographic proximity of the user equipment 102. For example, the macro cell 104 may decide to perform handover of wireless connection due to poor signal quality, load on the macro cell 104, and/or type of data transmission. The core network 108 may send a push notification in any known control message or a new message. Thus, upon receiving the push notification, the user equipment 102 can initiate a scan for small cells 106 in proximity to the user equipment 102. The user equipment 102 may initiate a scan for small cells 106 only after receiving a notification from the core network 108 and terminate the scan upon detecting a desired small cell 106 or after successful handover to the desired small cell 106.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for providing information by a core network entity in a communication system, the method comprising:
   receiving, from a user equipment, a request requesting a notification of small cells in proximity of the user equipment;
   obtaining location information associated with the user equipment;
   obtaining a small cell map from a map database;
   determining whether one or more small cells are in the proximity of the user equipment based on the location information associated with the user equipment and the small cell map; and
   if one or more small cells are in the proximity of the user equipment, providing, by the core network entity through a base station, to the user equipment a notification indicating availability of the one or more small cells in the proximity of the user equipment,
   wherein scanning of the one or more small cells is initiated based on the notification by the user equipment receiving the notification, and
   wherein the providing of the notification indicating the availability of the one or more small cells in the proximity of the user equipment comprises, if one or more small cells are in the proximity of the user equipment, transmitting, by the core network entity through the base station, a tracking area update (TAU) response including the small cell map, overlapped with cell identifier information, and cell access parameters to the user equipment.

2. The method of claim 1, further comprising:
   if no small cells are in the proximity of the user equipment, providing a notification to the user equipment indicating that no small cells are available in the proximity of the user equipment to prompt the user equipment to terminate any ongoing scan for the one or more small cells.

3. The method of claim 1, wherein the obtaining of the location information associated with the user equipment comprises:
   tracking a location of the user equipment based on one or more of a cell identifier, an evolved node b (eNB) identifier, and a tracking area identifier.

4. The method of claim 1, wherein the obtaining of the location information associated with the user equipment comprises:
   periodically receiving geographical coordinate information from the user equipment,
   wherein the geographical coordinate information indicates a current location of the user equipment.

5. The method of claim 1, wherein the determining of whether the one or more small cells are in the proximity of the user equipment comprises:
   mapping a location of the user equipment to a location of the one or more small cells in the small cell map.

6. The method of claim 5, wherein the small cell map overlapped with the cell identifier information is transmitted to the user equipment using one of a non-access stratum message, a layer 2/layer 3 message, and a system information message.

7. The method of claim 6, wherein the small cell map overlapped with cell identifier information is transmitted to the user equipment on one of a radio channel and multimedia broadcast multicast system (MBMS) channel.

8. The method of claim 1, wherein the providing of the notification indicating availability of the one or more small cells in the proximity of the user equipment comprises:
   transmitting location information associated with the one or more small cells to the user equipment.

9. The method of claim 1, wherein the providing of the notification indicating availability of the one or more small cells in the proximity of the user equipment comprises:
broadcasting the notification indicating the availability of the one or more small cells in proximity to the user equipment.

10. The method of claim 1, wherein the providing of the notification indicating the availability of the one or more small cells in the proximity of the user equipment comprises:
transmitting a push notification indicating the availability of small cells in proximity to the user equipment.

11. A core network entity comprising:
a transceiver configured to receive, from a user equipment, a request requesting a notification of small cells in proximity of the user equipment; and
a processor configured to:
obtain location information associated with the user equipment,
obtain a small cell map from a map database,
determine whether one or more small cells are in the proximity of the user equipment based on the location information associated with the user equipment and the small cell map, and
control the transceiver to, if one or more small cells are in the proximity of the user equipment, provide, through a base station, to the user equipment a notification indicating availability of the one or more small cells in the proximity of the user equipment,
wherein scanning of the one or more small cells is initiated based on the notification by the user equipment receiving the notification, and
wherein, when providing the notification indicating the availability of the one or more small cells in the proximity of the user equipment, the processor is further configured to control the transceiver to, if one or more small cells are in the proximity of the user equipment, transmit, from the core network entity through the base station, a tracking area update (TAU) response including the small cell map, overlapped with cell identifier information, and cell access parameters to the user equipment.

12. The core network entity of claim 11, wherein the processor is further configured to control the transceiver to:
if no small cells are available in proximity to the user equipment, provide a notification to the user equipment indicating that no small cells are available in the proximity of the user equipment to prompt the user equipment to terminate any ongoing scan for the one or more small cells.

13. The core network entity of claim 11, wherein, when determining whether the one or more small cells are in the proximity of the user equipment, the processor is further configured to:
map a location of the user equipment to a location of the one or more small cells in the small cell map.

14. The core network entity of claim 11, wherein, when providing the notification indicating availability of the one or more small cells in the proximity of the user equipment, the processor is further configured to control the transceiver to transmit the location information associated with the one or more small cells to the user equipment.

15. The core network entity of claim 11, wherein, when providing the notification indicating availability of the one or more small cells in the proximity of the user equipment, the processor is further configured to control the transceiver to transmit a geographical coordinate map and cell access parameters to the user equipment.

* * * * *